Nov. 23, 1937.  A. C. LINDGREN  2,099,816
BRAKE FOR TRAILERS
Filed Feb. 29, 1936
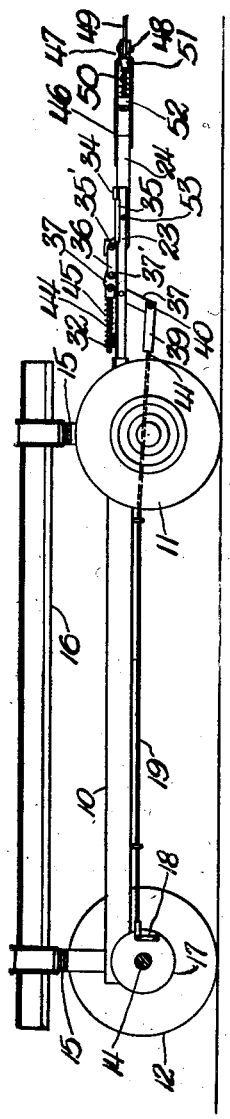
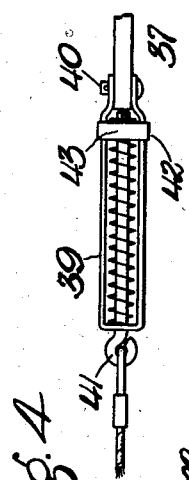
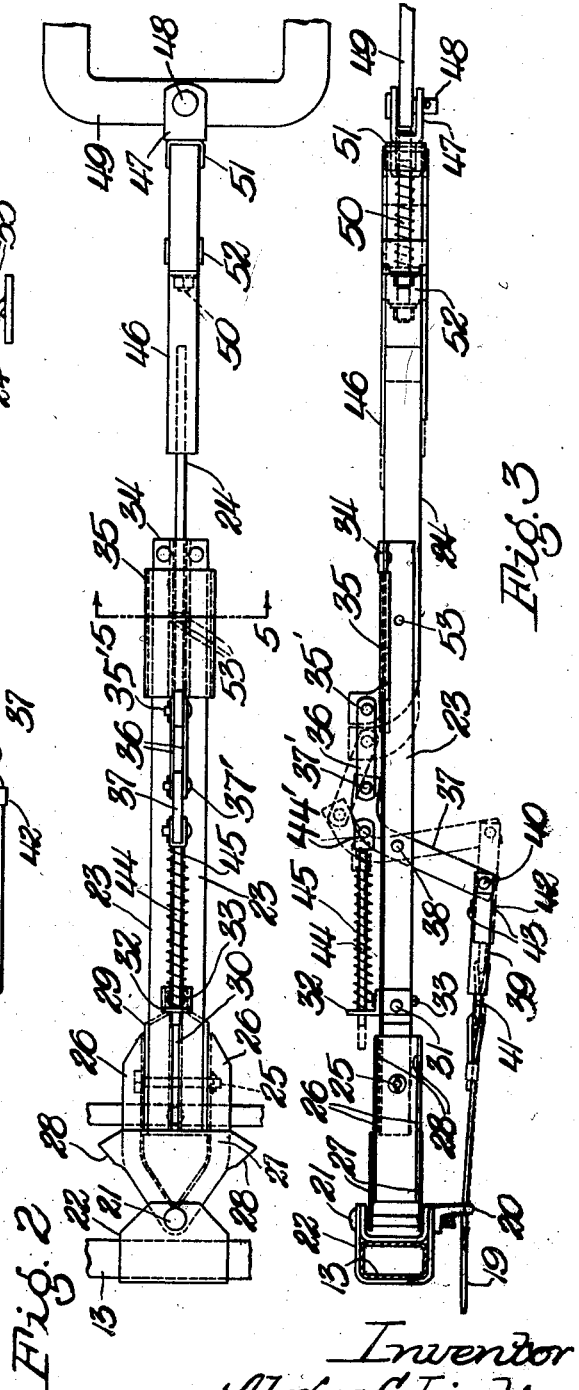
Inventor
Alexius C. Lindgren Patented Nov. 23, 1937

2,099,816

UNITED STATES PATENT OFFICE 2,099,816

BRAKE FOR TRAILERS

Alexus C. Lindgren, Chicago, Ill., assignor to International Harvester Company, a corporation of New Jersey Application February 29, 1936, Serial No. 66,347

6 Claims. (Cl. 188—142)

This invention relates to a brake operating means for trailing vehicles. More specifically it relates to an automatic braking system constructed to be operated by movement of the trailing vehicle relative to the towing vehicle.

Various types of automatic braking systems have been devised for trailing vehicles pulled by tractors, trucks, or by other towing means. In all of these in which the brake was applied by over-running pressure of the trailed vehicle in the line of draft, the braking action began with a slight pressure and continued in proportion to the pressure. Under many conditions of operation of trailers it is undesirable to have the brakes applied by small irregularities in the draft, such as are caused by road irregularities, or slight decreases in speed of the towing unit. It is to meet these conditions and to overcome the difficulties of the prior device that the present invention has been made.

The principal object of this invention is to construct a braking device for trailing vehicles operative to automatically apply the brakes only upon a predeterminable over-running pressure of the trailer against the towing unit.

In the drawing:

Figure 1 shows a trailing vehicle diagrammatically and a hitch which incorporates the brake operating means of the invention;

Figure 2 is an enlarged plan view of the hitch shown in Figure 1 and includes a portion of a tractor draw-bar;

Figure 3 is a side elevation of the structure shown in Figure 2;

Figure 4 is an enlarged plan view of the resilient connection between the actuating structure and the brake operating cable; and, Figure 5 is a cross section on the line 5—5 of Figure 2.

As illustrated in Figure 1, a vehicle is shown with pneumatic tires. Vehicles of this type have recently come into use for trailers to be used behind tractors and trucks. The vehicle construction is shown diagrammatically as well as the brake on one of the rear wheels. It is to be understood that the hitch and brake applying device of this invention may be used with any type of two or four wheeled trailing vehicle. As illustrated, the vehicle includes a frame 10, front wheels 11, rear wheels 12, a front axle 13, and a rear axle 14. Bolsters 15 are shown, which support a platform 16. A brake drum 17 is illustrated in Figure 1, through the cover plate of which a brake shoe operating element 18 extends. A brake operating cable 19 extending through guide members on the frame is connected to the element 18. There may be two of these cables, one extending to each rear wheel. The cables may be connected adjacent their forward ends to a single cable which extends to the brake operating mechanism.

The actuating cable 19 extends through an eye 20 secured to a pivot pin 21, which connects the draft structure and hitch on a vertical pivot to an attaching bracket 22 secured to the front axle 13.

The draft structure consists principally of two laterally spaced angle bars 23 and a flat draft member which slidably extends between the angle bars. At their rear ends the angle bars 23 are pivoted by a transverse pin 25 on spaced members 26, which are secured to top and bottom plates 27 substantially triangular in shape. Said plates are provided with vertically aligned openings, through which the pivot pin 21 extends. The triangular members 27 are also provided with stops 28, which engage the axle to form a limiting means whereby the hitch cannot engage the vehicle wheels when turning. A U-shape reenforcing member 29 is secured at the rear of the angle bars to provide a proper structure for pivoting on the pin 25. A spacer bar 30 is also utilized between the bars 23. Said U-shape member extends forwardly, the two arms thereof being bent toward each other and being connected to the angle bars by a rivet 31. Adjacent said rivet an apertured upstanding bracket 32 is secured to the angle bars by a bolt 33.

At their forward ends the angle bars 23 are connected in spaced relation by a transverse plate 34 riveted to the flanges of the angle bars. The draft member 24, which slidably extends between the angle bars 23, is secured by welding to a plate-like structure 35. Said structure is bent over and under the side flanges of the angle bars, as best shown in Figure 5, to form means for holding the draft member against motion relative to the angle bars except for a telescopic movement within the range permitted. Rearwardly of the structure 35, the draft member 24 extends upwardly above the angle bar 23 and is connected by a pair of links 36 and pins 35' and 37' to a brake actuating member 37. Said member has a forwardly curved portion about the angle bars 23 and a downwardly directed portion below said bars.

The member 37 is pivoted on a transverse pin 38 to the angle bars. The lower end of said member is resiliently connected to the brake operating element 19 by the structure shown in Figure 4. A cage structure 39 is pivotally connected by a pin 40 to the lower end of the member 37. An eye bolt 41 connected to the brake operating cable 19 slidably extends through an opening in the forward end of the structure 39 and is provided with a surrounding compression spring within said structure. The eye bolt is provided with a head structure 42 which is slidable in the cage structure, being guided by upper and lower cross members 43. This structure is understood from its description, being merely a well-known expedient for applying resilient tension on the brake operating cable.

About the angle bars 23, a rod 44 is pivotally connected to the curved portion of the actuating member 37 by means of a suitable clevis 44' formed integrally therewith or rigidly secured thereto. The rear end of the rod 44 slidably extends through the opening in bracket 32 previously described. A compression spring 45, surrounding the rod 44, abuts the forward side of the bracket 32 and the clevis 44' formed at the forward end of the rod which forms a stop.

The draft member 24 extends into a structure 46 consisting of vertically spaced plates, and is welded thereto. The structure 46 is provided at its forward end with a conventional resilient draft connection in the form of a swivel to provide for a resilient connection capable of universal movement. A clevis 47 is connected by a vertical pin 48 with the draw-bar 49, such as is commonly used on farm tractors. It is to be understood that the clevis 47 might be secured to any towing vehicle. Said clevis is connected by a rearwardly extending, horizontal shaft 50 to the hitch structure. The shaft 50 extends through an opening in a member 51 welded to the forward end of the structure 46 and forming a part thereof. A compression spring surrounding the shaft 50 abuts the inner side of the member 50 and against an abutment 52 secured on the shaft 50 by a threaded nut. By means of this construction a resilient hitch connection is provided. To provide a locking means when the brake is not desired, or for backing, aligned holes 53 are formed in the angle bars 23 and in the draft member 24, when it is in the position shown in Figures 2 and 3. A pin may be inserted in the opening when desired.

The operation of the hitch and brake applying device, as above described, will be understood from the description. Figure 3 shows in dotted position the location of the parts when the brakes are applied. The compression spring 45, acting against the member 37, maintains it in inoperative position to initiate application of the brakes during the application of slight overrunning pressure against the towing vehicle, such as might be caused by road irregularities and small decreases in speed of the towing vehicle. The pivot point of the rod 44 on the member 37 is rather close to the center line between the pin 38 and the pivot pin 37'. It is, therefore, evident that a substantial pressure is required to brake or release the lock formed by this linkage, which is of a toggle construction. However, when sufficient over-running pressure is applied to brake the linkage, the brakes are then applied with a force determined by the length and construction of the various elements making up the linkage, also by the compression rate of the springs 45. After the initial application the brakes continue to be applied by a much lower overrunning pressure than the pressure required to release the lock. This construction has a marked advantage in its functioning over those of the prior art in which the brakes were applied upon any slight over-running pressure sufficient to apply the brakes. Such braking action causes undue jerky operation and gives an excess amount of wear on the brakes and on the tires of the trailing vehicles.

It is to be understood that applicant has shown and described only a preferred embodiment of his improved hitch and brake applying device and that he claims as his invention all modifications falling within the scope of the appended claims.

What is claimed is:

1. A combination draft hitch and brake applying device for trailing vehicles comprising in combination with the vehicle, a draft structure connected to the vehicle and extending forwardly therefrom, a draft member telescopically mounted with respect to said draft structure, a brake operating member pivoted on a transverse axis on the draft structure, a brake operating element connected to said member and to the brakes of the vehicle, a link pivoted to said member and to the draft member, a retaining member pivoted to the brake operating member at a point spaced from its pivot point on the draft structure, a bracket mounted on the draft structure provided with an opening through which the retaining member slidably extends, and a compression spring abutting the bracket and a stop on the retaining member whereby pressure exerted by the spring maintains the draft element in extended position until a predetermined over-run pressure as controlled by the spring pressure is exerted in a forward direction.

2. A draft hitch and brake applying device for trailing vehicles comprising in combination with the vehicle, a draft structure connected to the vehicle and extending forwardly therefrom, a draft member telescopically mounted with respect to said draft structure, stop means being provided to limit movement of the draft member in the forward direction whereby draft may be applied to the vehicle, a brake operating member pivoted on a transverse axis on the draft structure, a brake operating element connected to one end of said member and to the brakes of the vehicle, a link pivoted to the other end of said member and to the draft member, the pivot between the link and the brake operating member being close to the center line of the pivots of the link draft member and the pivot of the brake actuating member on the draft structure whereby a small pressure is sufficient to maintain the linkage against breaking by over-running pressure of the draft structure with respect to the draft member, and resilient means positioned to exert pressure on the brake operating member to maintain the draft elements in extended position until a predetermined over-run pressure as controlled by the spring pressure is exerted in a forward direction.

3. A draft hitch and brake applying device for trailing vehicles comprising, in combination with the vehicle, a draft structure connected to the vehicle and extending forwardly therefrom, a draft member telescopically mounted with respect to said draft structure, stop means being provided to limit movement of the draft member in the forward direction whereby draft may be applied to the vehicle, a brake operating member pivoted on a transverse axis on the draft structure and extending above and below said structure, a brake operating element connected to the lower end of said member and to the brakes of the vehicle, a link pivoted to the upper end of said member and to the draft member, the pivot between the link and the brake operating member being close to the center line of the pivots of the link draft member and the pivot of the brake actuating member on the draft structure whereby a small pressure is sufficient to maintain the linkage against breaking by over-running pressure of the draft structure with respect to the draft member, a retaining member pivoted to the brake operating member above its pivot point on the draft structure and extending rearwardly therefrom, a bracket mounted on the draft structure provided with an opening through which the retaining member slidably extends, and a compression spring abutting the bracket and a stop on the retaining member whereby pressure exerted by the spring maintains the draft elements in extended position until a predetermined over-run pressure as controlled by the spring pressure is exerted in a forward direction.

4. A combined draft hitch and brake applying device for trailing vehicles provided with brakes, comprising brake applying means, a draft member mounted for limited movement with respect to the vehicle in the direction of the line of draft, a linkage connected to the brake applying means and to said member, said linkage including means consisting of a link and a spring acting on the link to provide a releasable lock for the member when in draft applying position, said means being constructed to release the draft member for movement toward the vehicle and to apply the brakes upon the application of a predetermined overrunning pressure of the vehicle against the draft member, said means operating after initial displacement of the draft member to continue application of the brakes with a substantially less overrun pressure than the pressure required to release the lock.

5. A combined draft hitch and brake applying device for trailing vehicles provided with brakes, comprising brake applying means, two draft members mounted for limited movement with respect to each other in the direction of the line of draft, a linkage connected to the brake applying means and to said members, said linkage including means consisting of a link and a spring acting on the link to provide a releasable lock for the members when in draft applying position, said means being constructed to release the draft members for relative movement and to apply the brakes upon the application of a predetermined overrunning pressure of the vehicle against the draft members, said means operating after initial displacement of the draft members to continue application of the brakes with a substantially less overrun pressure than the pressure required to release the lock.

6. A combined draft hitch and brake applying device for trailing vehicles comprising two draft members mounted to have movement relative to each other in the direction of the line of draft, a link pivotally connected to one member, brake applying means connected to said member, a second link pivotally connected to said first named link and to the other draft member, said links forming a toggle acting in one position to hold the draft member against relative movement and spring means connected to one of the members and to one of the links, said means being operative to hold the links against movement until a predetermined overrun pressure is exerted against the draft members, one of the connections between the links, spring means, and members being such as to rapidly increase the length of the torque arm effective to apply the brakes after a predetermined overrun pressure is obtained sufficient to initiate relative movement of the draft members whereby application of the brakes is continued with a substantially less overrun pressure.

ALEXUS C. LINDGREN.